Figure 1:
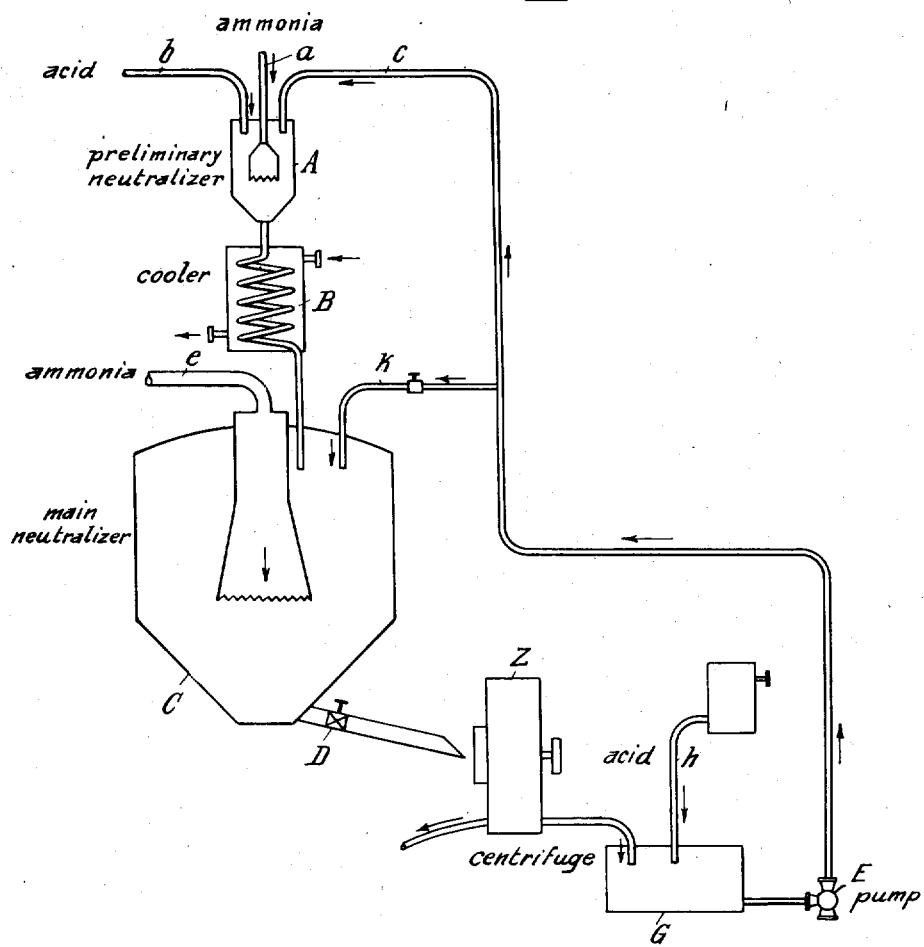

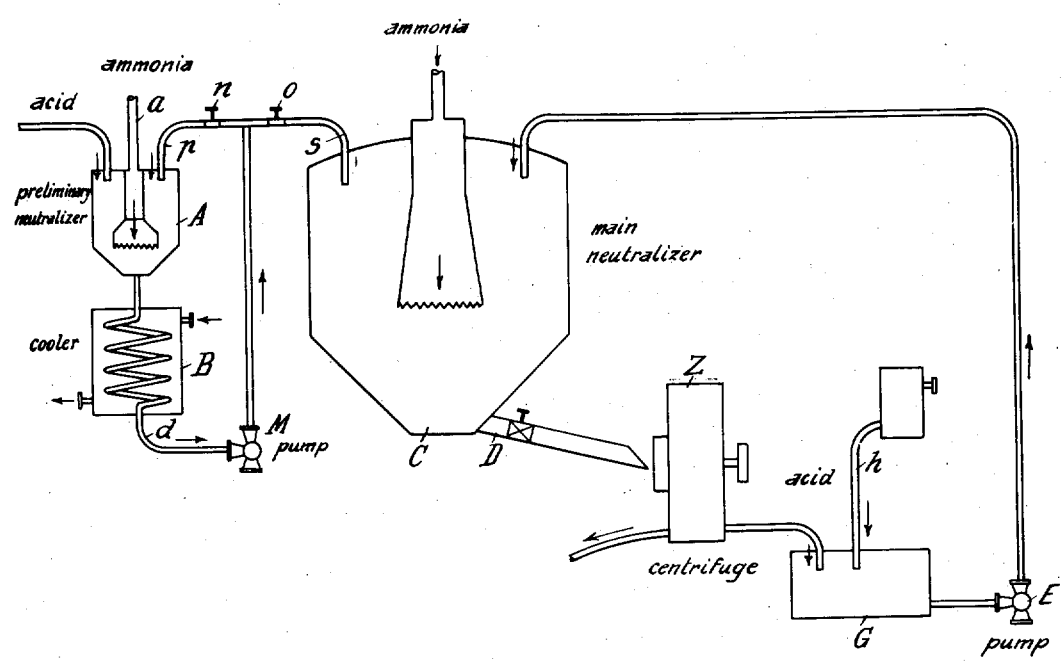

Patented Aug. 22, 1933

1,923,212

UNITED STATES PATENT OFFICE 1,923,212

PRODUCTION OF AMMONIUM COMPOUNDS

Friedrich Jost, Bornig near Herne, and Günther Hornung, Herne, Germany, assignors to the firm Patentverwertungs A. G. "Alpina," S. A. pour l'Exploitation de Brevets "Alpina", Patents Exploitation Cy. "Alpina" Ltd., Basel, Switzerland Application February 6, 1930, Serial No. 426,426, and in Germany February 11, 1929

14 Claims. (Cl. 23—119)

Our invention refers to the production of chemical compounds produced by mixing a basic substance with an acid for partial or total neutralisation. It has particular reference to the production of ammonium salts, such as ammonium sulfate or ammonium nitrate from ammonia and sulfuric acid or nitric acid. One of its objects is to improve the saturation process in order to save time and energy and to increase the yield of the final products to be obtained.

Hitherto ammonium salts, for instance ammonium sulfate, have been produced by conducting ammonia gas into acids, such as sulfuric acid, the mixing being effected in a neutralizing vessel (neutralizer). Obviously the output of such neutralizer will be the greater, the more ammonia is combined with sulfuric acid per unit of time and space. This output is however limited by the fact that the heat of dilution, which is liberated on water and sulfuric acid being mixed, and the heat of reaction cause the solution to be heated to the extent that the escaping vapors will carry away a certain proportion of uncombined ammonia. Therefore, in order to avoid losses in nitrogen, these vapors must be subjected to a repeated treatment with acid in order to bind the ammonia contained therein.

In order to avoid these difficulties, the acid used for neutralization has been diluted, but this involves the drawback, that in order to recover the solid ammonium sulfate, considerable energy must be used for evaporating the great quantities of water.

It has therefore already been suggested in connection with the production of ammonium nitrate to use for the dilution of the nitric acid a solution of ammonium nitrate saturated in the cold. It has further been suggested to avoid an overheating of the solution by cooling. However this latter step involves the disadvantage, that some of the ammonium salt will separate out on the outer walls of the cooling pipes, which are thus covered with a solid crust of the salt, and this crust will form a heat insulation, which will reduce the cooling action to a minimum.

We have succeeded in considerably improving the output of the neutralizing step by causing the basic constituent and the acid, for instance ammonia and sulfuric acid, to react with each other in two or more stages, the solution obtained in one stage being cooled before entering the next succeeding stage.

In carrying out our invention we may proceed for instance in such manner, that in a preliminary neutralizing vessel sulfuric acid and ammonia gas are made to react with each other to form a solution of ammonium sulfate and/or bisulfate, which on being cooled to about 20° C. will not yet allow any crystals to separate out. The heat evolved in this reaction is removed by cooling in a separate cooler and the cold solution is then introduced into the main neutralizer, in which further quantities of ammonia are mixed with sulfuric acid, until solid ammonium sulfate separates out from the solution.

By causing a considerable part of the neutralization to take place in the preliminary stage and abstracting the heat developed in the reaction by cooling, the evolution of heat of reaction in the main neutralizer will be much lower, so that in this manner the output of the main neutralizer can be considerably increased without any ammonia being carried away by vapors escaping from the heated solution.

The ammonium sulfate thus formed can be separated out in any desired manner.

We may also add to the mother liquor separated from the solid salt fresh quantities of acid, this mixture being then made to circulate through the system, being introduced either into the preliminary or the main neutralizer by means of a pump as required in each individual case.

We may also produce a solution of ammonium sulfate in the preliminary neutralizer by operating in a rapid cycle, whereby the dimensions of the preliminary neutralizer and the cooler can be greatly reduced. A corresponding part of the acid will then be continuously introduced into the main neutralizer.

We may also operate in such manner that only the heat of dilution developed by the addition of water to the acid is removed in a separate vessel, the dilute acid being cooled before introducing same into the neutralizer.

In the drawings affixed to the specification and forming part thereof, two forms of a neutralizing apparatus embodying our invention are illustrated diagrammatically by way of example in vertical section.

Referring to the drawings and first to Fig. 1, $a$ and $b$ are pipes for supplying ammonia and acid, (for instance sulfuric acid) respectively, to the preliminary neutralizer A. The quantities of ammonia and acid are so chosen, that in the preliminary neutralizer a solution is formed, which is not saturated at 20° C. The heat of reaction is abstracted in the cooler B, through which the solution is made to flow before entering the main neutralizer C, into which further quantities of ammonia are introduced through the conduit e. From the bottom tap D the solution formed in the main neutralizer is fed into the centrifuge Z, where the solid salt is separated from the mother liquor. To this liquor we prefer adding part of the acid required in the main reaction, in order to heat the liquor, thus preventing the separation of salt therefrom, which might clog the pipes. This addition of acid to the liquor takes place in the vessel G through pipe h. The mixture of mother liquor and acid is then returned by means of a rotary pump through pipe c into the preliminary neutralizer or through pipe k into the main neutralizer C.

In the modification illustrated in Fig. 2, two separate circulation systems are provided and the size of the preliminary neutralizer and cooler can then be reduced. The solution of ammonia salt forming in the preliminary neutralizer A is kept in rapid circulation between the preliminary neutralizer A and the cooler B by means of a rotary pump M, which forces the cold solution back into the preliminary neutralizer A, only that quantity of the solution being allowed to escape into the main neutralizer C, which corresponds to the quantity of acid supplied into the main neutralizer. The distribution of the solution formed in A is controlled by valves n and o inserted in the pipes p and s leading from the delivery pipe t of the pump M to the preliminary and main neutralizer, respectively.

The mother liquor from the main neutralizer C can be returned into this neutralizer as described with reference to Fig. 1.

By thus subdividing the reaction into two or more stages and providing for a cooling of the liquor between the single stages, the output of the neutralizer is greatly increased.

In the claims the terms "neutralizing" and "neutralization" are intended to include both partial and total neutralization.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:

1. In the process of producing an ammonium salt by neutralizing an acid with ammonia in two stages and cooling the liquor between the stages, the step of producing in the first stage a solution, which is not saturated at about 20° C.

2. The process of producing an ammonium salt by neutralizing an acid with ammonia comprising first diluting the acid, cooling same and thereafter effecting neutralization.

3. The process of producing an ammonium salt by neutralizing an acid with ammonia comprising first diluting the acid with mother liquor resulting from a preceding operation, cooling the mixture and thereafter effecting neutralization.

4. In the manufacture of ammonium salts by the saturation method, the process which comprises partially neutralizing an acid corresponding to such a salt with ammonia, passing the resulting reaction products through a cooling zone wherein the temperature is lowered substantially, adding additional ammonia in a further stage of the process and recovering an ammonium salt from the resulting reaction products.

5. The process of claim 4 wherein the partially neutralized reaction products are cooled to a temperature just above the crystallization point.

6. The process of claim 4 wherein cooling of the partially neutralized reaction products is accomplished by cycling a stream of said products through said cooling zone and back to the partial neutralizing stage of the process.

7. The process of claim 4 wherein the acid neutralized is sulfuric acid.

8. In the manufacture of ammonium salts by the saturation method, the process which comprises reacting ammonia with an acid liquor in an initial ammoniating stage, positively cooling the ammoniated reaction products by passing the same through a cooler, further reacting the said products with ammonia in a second ammoniating stage and separately recovering an ammonium salt and a mother liquor from the resulting ammoniated reaction products.

9. The process of claim 8 wherein the mother liquor is recycled to at least one stage of the process.

10. The process of claim 8 wherein the mother liquor is recycled to the initial ammoniating stage of the process.

11. The process of claim 8 wherein the mother liquor is recycled to the second ammoniating stage of the process.

12. The process of claim 8 wherein cooling is effected by cycling the acid liquor from the initial ammoniating stage through said cooler and back to said initial stage.

13. The process of claim 8 wherein cooling is effected by cycling the acid liquor from the initial ammoniating stage through said cooler and back again, and wherein the mother liquor is recycled to the second ammoniating stage of the process.

14. The process of claim 8 wherein acid is added to the mother liquor and the acidified liquor is then cycled to a preceding step of said process.

FRIEDRICH JOST.
GÜNTHER HORNUNG.